May 30, 1972   D. M. SOWARDS   3,666,412
DISPERSED PHASE ACTIVATED AND STABILIZED METAL CATALYSTS
Filed Oct. 21, 1968
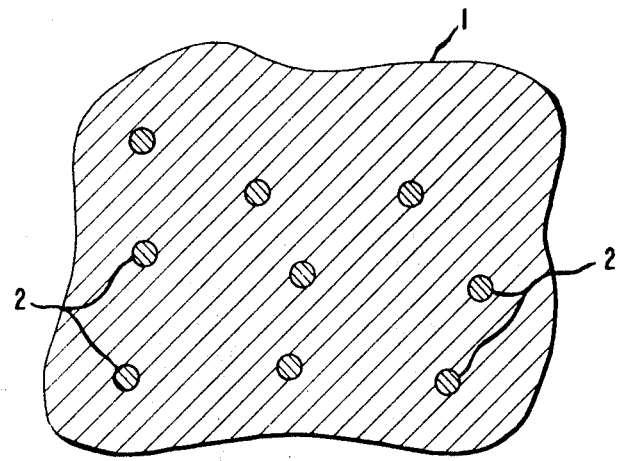
INVENTOR
DONALD M. SOWARDS
BY *Fred E. McKelvey*
ATTORNEY United States Patent Office 3,666,412
Patented May 30, 1972

3,666,412
DISPERSED PHASE ACTIVATED AND
STABILIZED METAL CATALYSTS
Donald M. Sowards, Claymont, Del., assignor to E. I. du
Pont de Nemours and Company, Wilmington, Del.
Filed Oct. 21, 1968, Ser. No. 769,059
Int. Cl. C01b 21/26, 33/20
U.S. Cl. 23—162                                    11 Claims

ABSTRACT OF THE DISCLOSURE

Catalytic systems comprising a catalytic metal, such as platinum or nickel, which have dispersed therein small particles of a non-metal, such as thoria, silica, or zirconia, have been found to have good activity and durability. The catalyst systems are useful in those environments where metal catalysts are conventionally used such as in ammonia oxidations and methane reforming.

DESCRIPTION OF THE INVENTION

This invention relates to dispersed phase, activated, and stabilized metal catalyst systems useful in high temperature catalytic environments. The catalysts comprise a catalytic metal containing dispersed therein small particles of a non-metal. By "dispersed phase" is meant a second phase (non-metal phase) isolated within individual metal crystallites. The dispersed phase is a discontinuous array of occluded particles of a size much smaller than the metal crystallite size.

A "dispersed phase" is to be contrasted with an "interspersed phase," the latter being a second phase distributed between individual metal catalyst crystallites.

The drawing shows a cross-section of an artist's sketch of a catalytic particle of this invention where there is dispersed within metal 1 various particles of non-metal 2.

The catalysts of this invention are useful in processes in which metal catalysts are conventionally used such as in ammonia oxidation reactions, methane, reforming, hydrocarbon oxidations and hydrogenations, nitrogen oxide reductions, carbon monoxide oxidations, and the like. It has been found that metal catalysts having non-metals dispersed therein are active and durable. The unusual activity of the catalysts is believed to be a result of distortion and strain energy developed by the interaction of these dissimilar materials. The durability of the activity is believed to result from stabilization against recrystallization of the metal phase.

The metal portion of the instant catalyst systems can be any suitable metal known to have catalytic acivity. Exemplary of such metals are:

platinum          copper
iridium           germanium
iron              tin
palladium         lead
rhodium           rhenium
ruthenium         silver
nickel            gold
cobalt and their alloys.

The non-metal can be any material which is stable, i.e., does not change form and/or adversely affect catalytic activity of the metal with which it is in contact, under the conditions of operation. Examples of these non-metals are the oxides.

calcium           cerium
yttrium           aluminum
lanthanum         zirconium
beryllium         barium
thorium           silicon
magnesium         titanium
uranium           chromium
hafnium and combinations of these such as zircon ($ZrSi_4$), spinels such as $MgAl_2O_4$ and didymium oxide $[(La,Pr)_2O_3]$. In addition to metal oxides, other refractory materials may be used as the non-metal, such as carbides, nitrides, borides, and silicides. As examples of these latter materials there may be mentioned silicon carbide, tungsten carbide, aluminum nitride, zirconium boride, and molybdenum silicide.

The catalyst particles can be any suitable size normally used in catalytic operations. Suitable catalysts generally have sizes ranging from 0.1 micron to 250 microns, preferably from 2 microns to 100 microns. The metal portion of the catalyst generally constitutes from 10% by volume to 90% by volume, preferably 50% to 90%.

The catalyst may be prepared by numerous methods. Dispersed phase metals per se are old, these having been used in metallurgical processing for some time, and can be prepared in any convenient method such as that shown in U.S. Pats. 2,972,529; 3,024,110; 3,082,084; 3,085,876; 3,087,234; 3,129,093; 3,143,789; 3,150,443; 3,152,389; 3,159,908; 3,218,135; 3,290,126; 3,290,144; 3,310,400; 3,317,285; 3,326,677. The present catalysts are prepared in the same manner in which dispersed phase metals are prepared, care being taken to adjust the ratio of metal to non-metal so that the volume percent of dispersed non-metal is between 10% and 90%.

The following examples illustrate preparation and use of the catalysts of the invention. Parts are recited in parts by weight unless otherwise noted.

EXAMPLE 1

Preparation of platinum nitrate

One part of platinum chloride ($PtCl_2$) is added to 10 parts of a 25% aqueous solution of nitric acid ($HNO_3$). The mixture is heated to 80° C. to evaporate the water. The remaining solids are cooled to room temperature. Ten additional parts of the nitric acid solution is added and the temperature is raised to 80° C. to again evaporate water. The solids are again cooled to room temperature. The addition of nitric acid, heating to evaporate water, and cooling is repeated once more. The solids are then added to enough water to yield a nitrate solution containing 10% platinum by weight.

Preparation of the catalysts

To 60 parts of the platinum solution there is then added 5.5 parts of thorium nitrate $[Th(NO_3)_4 \cdot 4H_2O]$. The resulting solution is then added dropwise into a solution consisting of 500 ml. water, 60 ml. ammonium hydroxide ($NH_4OH$), and 20 ml. of hydrazine hydrate ($H_2NNH_2 \cdot H_2O$). During the dropwise addition, the solution is vigorously stirred at a temperature between 85° C. and 90° C. A precipitate is formed during the addition. It is washed with large quantities of water to remove any salts. Electron microscope observation of the moist precipitate revealed a homogenous two-phase fine powder.

Item 2

A prior art catalyst system is prepared by suspending 2.6 grams of —325 mesh thoria ($ThO_2$) in 60 ml. of a 10% platinum (as nitrate) solution. This suspension is then added dropwise into 500 ml. of water, 60 ml. of ammonium nitrate, and 20 ml. of hydrazine hydrate while stirring and maintaining the environment between 85° C. and 90° C. The precipitate formed is washed with water to remove salts. The moist precipitate was observed through an electron microscope wherein three distinct phases were revealed. Both catalysts contain 52% by volume of platinum and 48% by volume of thoria.

Comparison of catalysts

Films of the catalyst materials from Items 1 and 2 are prepared as follows. Five grams of the moist powder are washed with large quantities of methanol ($CH_3OH$) to remove most of the water in the powder. The methanol wet paste is mixed with a few drops of a 10% bis-tri-methylphosphineplatinum(II)-dichloride in methanol. The resulting suspension is spread as a very thin film (0.1 mm.) on electronic grade α-alumina blanks and is heated to about 650° C. slowly in a soft flame. Films prepared from both Items 1 and 2 were gray and very similar in physical appearance.

While the films are hot (650° C.), the flame is extinguished, but fuel mixture is allowed to continue contacting the films. Both films continue to "glow" thus indicating that they are catalytically active. The samples are then heated in a furnace to 900° C. for 40 hours to simulate lighter in color but shows no growth of massive platinum when observed under a microscope at 140× magnification. When the flame test described supra is repeated, the film prepared from Item 1 continues to show catalytic activity. The film prepared from Item 2, however, shows large crystals of platinum growing on the surface and a second flame test reveals that catalytic activity diminished almost completely.

The two heat aged films are re-examined through the electron microscope. The film from Item 1 shows a porous aggregate of particles with a continuous metal phase of small crystallite size. There are many small particles of thoria dispersed within the metal phase. The film from Item 2 shows a single phase of large aggregates of thoria with occasional dense feathery particles of platinum metal entrapped within the aggregate voids.

EXAMPLE 2

Preparation of catalysts

Item 1

One hundred and fifty ml. of an aqueous solution of 10% colloidal thoria having an average particles size of about 140 angstroms and 400 ml. of an aqueous solution of concentrated nickel nitrate [$Ni(NO_3)_3$] are stirred into 3 liters of an ammonium carbonate ($NH_4HCO_3$) solution maintained at a pH of about 6.0 by purging said solution with gaseous ammonia and carbon dioxide. The solid precipitate is recovered by filtration, thereafter washed with water, dried in air, and calcined at 450° C. for 2 hours. Thereafter, the solid is reduced with hydrogen at 500° C. A nickel catalyst with thoria dispersed therein is recovered.

Item 2

A prior art catalyst is prepared by adding 300 ml. of a saturated nickel nitrate solution into 3 liters of an ammonium carbonate solution maintained at a pH of about 6.0 by purging said solution with ammonia and carbon dioxide. A solid precipitate is recovered by filtration. The filtrate is washed with water, dried in air, calcined at 450° C. for 2 hours, and reduced with hydrogen at 500° C. A pure nickel catalyst is recovered.

Comparison of the catalysts

Both catalyst systems are pyrophoric on exposure to air. Individual portions of both systems are then heated at 100° C. increments for 2 hours in hydrogen. The catalyst of Item 1 is heated to 1100° C. before it recrystallizes to a nonpyrophoric product. The catalyst of Item 2 requires heating to only 800° C. to attain the same inactive state of recrystallization.

X-ray examination of the thermally stabilized products shows the following:

Item 1.—almost amorphour thoria and nickel metal of about 500 anstroms crystallite size;

Item 2.—nickel metal with crystallites larger than one micron.

It is evident that the dispersed thoria stabilizes the small nickel crystallites with respect to recrystallization.

Portions of the catalysts of Items 1 and 2 are interspersed with 9 times their weight of aluminum oxide ($Al_2O_3$). The aluminum oxide phase is a continuous phase. Accordingly, the interpersed product of Item 1 has three distinct phases while that of Item 2 has only two distinct phases. Both interspersed products are dried in air at room temperature. The products are then calcined at 500° C. for 90 minutes followed by reduction in the presence of hydrogen at 450° C. for 120 minutes. The reduced products are tested in a steam-methane reformer at 870° C. Initially the material from Item 1 converts 94.2% of the methane at a throughput of 15 liters of methane per gram of catalyst per hour while the material of Item 2 converts 91.2% at a lower throughput of 13.4/hr. After 200 hours, the catalyst of Item 1 has a throughput of 15.2/hr. while that of Item 2 has decreased to 12.9/hr., both for a 92% conversion of methane.

EXAMPLE 3

Item 1

Sixteen one hundredths gram of a hydrophobic silica prepared by the flame oxidation at 1100° C. of silicon tetrachloride ($SiCl_4$) is dispersed in 400 ml. of a dimethyl sulfoxide,

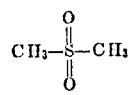

solution containing 5% platinum as bis-tributylphosphine-platinum-(II)-dinitrate. The resulting solution is stirred and heated to 300° C. under a vacuum of 1 mm. Hg absolute for 20 hours. The product is then treated with hydrogen at 300° C. for 3 hours. A spongy metallic product is obtained which is then ground into a fine powder (—100 mesh). The powder contains 0.8% silica (8% by volume) and 99.18% platinum (92% by volume). It is compressed in a steel mold at 10 tons/sq. in., sintered at 1200° C. for 4 hours, and annealed at 680° C. for 1 hour. Thereafter, the annealed material is cold rolled into a thin bar (0.5 mm.) of metal. Examination of this bar under an electron microscope shows a continuous metal phase with 380 angstroms to 890 angstroms diameters silica particles. A major (70%) of the particles were of the smaller type and were dispersed within the metal grains; some of the larger size particles are located within the grain boundaries.

Item 2

A second product is made according to the procedure used to prepare Item 1 except that 1 gram of hydrophobic silica and 380 ml. of the dimethyl sulfoxide solution are used. The product contains 5.1% silica (35% by volume) and 95% platinum (65% by volume). The product is compacted according to the procedure of Item 1.

Item 3

A third product is made according to the procedure used to prepare Item 1 except that 6.5 grams of the hysolution are used. The product contains 32% silica (74% by volume). When examined under an electron microscope, it is revealed that the product contains only one phase of aggregated material.

Comparison of materials

Portions of the materials of Items 1, 2 and 3 containing 10 grams of platinum are tested in the hydrogenation of acetylene to ethylene by the reaction:

$$HC \equiv CH + H_2 \rightarrow CH = CH_2$$

The relative efficiencies are evaluated by measuring the amount of ethylene produced under the same conditions per 1 gram of platinum per hour. The relative efficiencies are:

Item 1 _____ 1
Item 2 _____ 18
Item 3 _____ 163

EXAMPLE 4

A solution is prepared by mixing together 200 grams of sulfamic acid ($H_2NSO_3H$), 800 ml. water, and 80 grams of diaminoplatinum dinitrite and bringing the temperature to 95° C. A colloidal zirconia sol is added to provide 26 grams of zirconium oxide ($ZrO_2$) and solution volume is adjusted to a total of 2.1 liters by addition of water.

The solution temperature is adjusted to 70° C. A 40 mesh platinum gauze is then placed into the solution and is electroplated at about 0.2 to 0.3 amps per square centimeter until the gauze contains a uniform coating about 8 microns in thickness. An investigation under an electron microscope shows the electroplated coating contains about 12% zirconium oxide.

The coated gauze is compared to a similar piece of uncoated gauze. After both gauzes are used for 100 hours under the same conditions during the production of nitric acid from air and ammonia at 870° C. according ot the equation:

$$NH_3 + 2O_2 \rightarrow NHO_3 + H_2O$$

the coated gauze remained unchanged while extensive surface rearrangement occurs on the uncoated gauze.

Use of catalysts on ceramic materials

The catalyst components of this invention are particularly attractive when used in combination of ceramic supports, such as a ceramic honeycomb. Ceramic honeycombs are known in the art and are disclosed in U.S. Pat. 3,255,027 to Talsma, issued June 7, 1966. The catalysts may be placed on ceramic supports by various methods. One method is shown in U.S. Pat. 3,397,154 to Talsma issued Aug. 13, 1968, wherein a catalytically active metal is deposited in the ceramic support. A second method is shown in copending application Ser. No. 644,488, filed June 8, 1967, by Aarons. This application discloses a process wherein the catalyst is applied with colloidal boehmite and finely divided, high surface active alumina to a honeycomb support followed by calcining. Optionally the catalyst can be applied to the honeycomb after the application of the alumina. Another method for placing the catalyst on the honeycomb is shown in U.S. Pat. 2,580,806 to Malina, issued Jan. 1, 1952. This process comprises (1) uniformly dispersing a finely divided, solid, active metal oxide, such as aluminum, magnesium, beryllium, or thorium oxide, in a liquid solution of a metal salt of a metal such as aluminum (2) applying the dispersion to the ceramic honeycomb, and (3) drying the active metal oxide on the honeycomb. The catalyst is then applied to the cooled honeycomb by a conventional method, such as by precipitating a metal out of solution onto the honeycomb. Yet another method is disclosed in copending application Ser. No. 684,553, filed Nov. 20, 1967, by Sowards and Stiles. There it is disclosed that an aqueous composition of colloidal amorphous silica spherulites and catalytic material are applied to a honeycomb substrate. The catalytic metal is then activated by calcining or reduction.

The preferred ceramic honeycombs are made from substantially pure alpha alumina or mullite.

The following example illustrates the use of a catalyst component of this invention of a ceramic support.

EXAMPLE 5

A solution of tetraamino platinum-II-dinitrate [$(NH_3)_4Pt(NO_2)_2$] is prepared by dissolving diamino platinum-II-dinitrate [$(NH_3)_2Pt(NO_2)_2$] in ammonium hydroxide at 60° C.

Five and one-fifth grams of colloidal tungsten carbide and 25 ml. of hydrazine hydrate are added to 200 ml. of the platinum solution and stirred vigorously for 30 minutes. Thereafter, the solution is heated to 45° C. and stirred for 1 hour. The product is cooled, filtered, washed with water, and air dried. The yield is 25.04 grams of solid material.

Microscopic observation at 80× and 500× indicated a preponderance of aggregates of metal particles, there being a few metal flakes and uncoated tungsten carbide particles.

Ten grams of the dispersed phase tungsten carbide-platinum powder are blended with 100 grams of aqueous 10% colloidal boehmite in a ball mill for 16 hours. The resulting solution is coated onto pieces of mullite ceramic honeycomb, air dried, and calcined at 450° C. for 30 minutes. The catalyst comprises about 3.6% by weight of the honeycomb structure.

A mixture of 3% by volume of carbon monoxide in air is passed through the catalyst coated honeycomb at 200° C. at 70,000 cubic feet of gas per gram of catalyst (platinum) per hour. Excellent catalytic activity is demonstrated by the oxidation of 92.8% of the carbon monoxide.

EXAMPLE 6

A solution containing 22 grams of palladium is prepared by dissolving palladium nitrate [$Pd(NO_3)_2$] in ammonium hydroxide at 60° C. and diluting to a volume of 400 ml. To this is added 7.4 grams of colloidal molybdenum disilicide ($MoSi_2$) and the mixture is ball milled for 18 hours. The product was cooled in an ice bath and stirred vigorously while 25 ml. of cold hydrazine in 100 ml. of water was added slowly during 1 hour. Thereafter the product is filtered, washed with water, and dried at 100° C. The yield was 29.1 grams of solid. Microscopic observation at 500× shows a single phase of clusters of small metal particles.

A positive colloidal silica sol is prepared according to the disclosure of U.S. Pat. 3,007,878 issued Nov. 7, 1961, to Alexander to contain 26.2% silica and 2.2% alumina. 29.1 grams of the dispersed phase metal product and 50 grams of the silica sol are ball milled for 18 hours. The resulting paste is diluted with 75 ml. of water and portions sprayed onto a mullite ceramic honeycomb. The sprayed honeycomb is air dried and heated to 250° C. for two hours. The catalyst comprises about 5.2% by weight of the honeycomb structure. The honeycomb product has a relative efficiency of about 114 when used as a catalyst for converting acetylene to ethylene according to the procedure used in Example 3.

EXAMPLE 7

A 400 gram acetonitrile solution containing 5% by weight silver as a complex formed from trimethyl phosphine and silver nitrate is ball milled with 5.7 grams of colloidal nitride for 3 days. 50 ml. of a hydrogen chloride saturated methanol solution is added and the resulting mixture is heated and stirred at reflux for about 4 hours. The resulting solids are filtered, washed with methanol, and dried at 105° C. This yields 25.7 grams of solid which represent a single phase of small metal particles.

Ten grams of the product is milled with 1.4 grams of silver nitrate in 25 ml. of water for 17 hours. This is sprayed onto an alumina ceramic honeycomb, dried, and calcined in nitrogen diluted moist hydrogen at 250° C. for 2 hours. The catalyst comprises about 12.2% by weight of the honeycomb structure.

The product exhibits good catalytic activity when used in the oxidation of methanol in air, at 535° C. according to the equation:

$$2CH_3OH + O_2 \rightarrow 2HCOH + 2H_2O$$

using an oxygen to methanol weight ratio of 0.45:1.00 at 8000 cubic feet of gas feed (air and methanol) per gram of catalyst per hour. About 70% of the methanol is converted to formaldehyde.

I claim:
1. In a catalytic process selected from the group consisting of:
   (a) oxidation of hydrocarbons,
   (b) oxidation of ammonia,
   (c) steam reforming of methane,
   (d) hydrogenation of hydrocarbons,
   (e) oxidation of carbon monoxide, and
   (f) oxidation of methanol to formaldehyde using as the catalyst one or more metals selected from the class consisting of platinum, iridium, iron, palladium, rhodium, ruthenium, nickel, cobalt, copper, germanium, tin, lead, rhenium, silver, and gold; the improvement comprising using as the catalyst a composition consisting essentially of a continuous metal phase having dispersed therein from 10% to 90% by volume of a non-metal, said non-metal being stable at the conditions at which the catalyst is used; the metal phase being selected from the group consisting of: platinum, iridium, iron, palladium, rhodium, ruthenium, nickel, cobalt, copper, germanium, tin, lead, rhenium, silver, and gold; and the non-metal being selected from oxides of calcium, yttrium, lanthanum, beryllium, thorium, magnesium, uranium, hafnium, cerium, aluminum, zirconium, barium, silicon, titanium, and chromium; silicon carbide, tungsten carbide, aluminum nitride, zirconium boride, and molybdenum silicide.

2. The improvement of claim 1 wherein said non-metal is present in amounts between 10% and 50%, by volume.
3. The improvement of claim 1 wherein said metal is platinum.
4. The improvement of claim 1 wherein said metal is nickel.
5. The improvement of claim 1 wherein said non-metal is thoria.
6. The improvement of claim 1 wherein said non-metal is silica.
7. The improvement of claim 1 wherein said non-metal is zirconia.
8. The improvement of claim 1 wherein said catalyst has been placed on an inert ceramic support.
9. The improvement of claim 8 wherein said support is a ceramic honeycomb.
10. The improvement of claim 9 wherein said ceramic honeycomb is substantially pure alpha alumina.
11. The improvement of claim 9 wherein said ceramic honeycomb is mullite.

References Cited
UNITED STATES PATENTS

| | | | |
|---|---|---|---|
| 2,752,665 | 7/1965 | Streicher | 29—182 |
| 3,087,234 | 4/1963 | Alexander et al. | 29—182.5 |
| 2,939,847 | 6/1960 | Smith et al. | 252—460 X |
| 2,942,041 | 6/1960 | Pitts Jr. et al. | 252—460 X |
| 3,371,050 | 2/1968 | Taylor et al. | 252—459 |

CARL F. DEES, Primary Examiner

U.S. Cl. X.R.

23—212 R, 213; 252—432, 454, 458, 460, 461, 463, 470, 472; 260—606, 677, 687